United States Patent
Dallos, Jr. et al.

(10) Patent No.: US 10,384,623 B2
(45) Date of Patent: Aug. 20, 2019

(54) CLIP ASSEMBLY AND A VEHICLE THAT UTILIZES THE CLIP ASSEMBLY

(71) Applicant: GM GLOBAL TECHNOLOGY OPERATIONS LLC, Detroit, MI (US)

(72) Inventors: Robert Dallos, Jr., Canton, MI (US); Michael J. Mukhtar, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 15/651,486

(22) Filed: Jul. 17, 2017

(65) Prior Publication Data

US 2019/0016277 A1    Jan. 17, 2019

(51) Int. Cl.
*B60R 13/04* (2006.01)
*F16B 21/00* (2006.01)

(52) U.S. Cl.
CPC .............. *B60R 13/04* (2013.01); *F16B 21/00* (2013.01)

(58) Field of Classification Search
CPC ........ B60R 13/04; Y10T 24/309; F16B 21/00; F16B 21/09
See application file for complete search history.

(56) References Cited

U.S. PATENT DOCUMENTS

| | | | | |
|---|---|---|---|---|
| 4,568,215 A | * | 2/1986 | Nelson | B29C 65/0672 24/297 |
| 6,196,607 B1 | * | 3/2001 | Gulisano | B60R 13/01 293/115 |
| 6,813,865 B2 | * | 11/2004 | Peterson | B60R 13/0206 296/39.1 |
| 7,178,855 B2 | * | 2/2007 | Catron | B60J 5/0468 24/297 |
| 2008/0066266 A1 | * | 3/2008 | Scroggie | B60R 13/0206 24/297 |

* cited by examiner

*Primary Examiner* — Robert Sandy
(74) *Attorney, Agent, or Firm* — Quinn IP Law

(57) ABSTRACT

A clip assembly includes a bracket defining a hole. A vehicle includes a component and the clip assembly attached to the component. The bracket includes an inner surface, a first side and a second side opposing the first side. The hole is defined through the first and second sides. The clip assembly includes a post disposed through the hole and an attachment feature formed to the post. The clip assembly includes a first stop and a second stop each formed to the post. The first stop is disposed between the first side of the bracket and the attachment feature. The second stop is spaced from the first stop, and the bracket is disposed between the first and second stops. The second side of the bracket is open such that the second stop is unsurrounded by the bracket relative to the second side.

20 Claims, 2 Drawing Sheets

CLIP ASSEMBLY AND A VEHICLE THAT UTILIZES THE CLIP ASSEMBLY

INTRODUCTION

Vehicles include one or more panels visible from outside of the vehicle. Some vehicles include exterior trim pieces that are attached to the vehicle through fasteners. Generally, a secondary bracket is secured to an inside of the respective trim pieces. The secondary bracket includes a plurality of protruding portions each defining a slot open at one side of the respective protruding portions. In a separate step, a plurality of fasteners are then individually secured to the respective protruding portions of the secondary bracket by being inserted through the respective slot. The secondary bracket includes a back wall that covers the inside of the trim pieces, and the back wall separates the protruding portions and the fasteners from the inside of the trim pieces.

SUMMARY

The present disclosure provides a clip assembly including a bracket defining a hole. The bracket includes an inner surface defining an outer boundary of the hole. The bracket includes a first side and a second side opposing the first side. The hole is defined through the first and second sides, and the inner surface is disposed between the first and second sides. The clip assembly also includes a post disposed through the hole and an attachment feature formed to the post. Furthermore, the clip assembly includes a first stop formed to the post and a second stop formed to the post. The first stop is disposed between the first side of the bracket and the attachment feature. The second stop is spaced from the first stop, and the bracket is disposed between the first and second stops. The second side of the bracket is open such that the second stop is unsurrounded by the bracket relative to the second side.

The present disclosure also provides a vehicle including a component and a clip assembly attached to the component. The clip assembly includes the features discussed above.

The clip assembly optionally includes one or more of the following:

A) the post includes an outer surface spaced from the inner surface when the post is centered in the hole to define a radial degree of freedom that the post is movable relative to the inner surface;

B) the first and second stops are spaced apart to define an axial degree of freedom that the post is movable through the hole;

C) the bracket includes a base portion and a raised portion that steps outwardly from the base portion to define a recess;

D) the raised portion defines the hole;

E) the second stop is disposed in the recess;

F) the base portion is further defined as a first base portion and the bracket further includes a second base portion spaced from the first base portion;

G) the raised portion is disposed between the first and second raised portions such that the recess is disposed between the first and second base portions;

H) the first stop includes a first disk having an outer diameter greater than a diameter of the hole;

I) the second stop includes a second disk having an outer diameter greater than the diameter of the hole;

J) the first and second disks retain the post and the attachment feature relative to the bracket;

K) the attachment feature includes a barb extending outwardly from the post;

L) the post includes a first distal end and a second distal end spaced from each other;

M) the attachment feature is disposed at the first distal end and the second disk disposed at the second distal end;

N) the barb is disposed at the first distal end and the second disk disposed at the second distal end;

O) the first disk is spaced between the first and second distal ends;

P) the second stop includes a first face facing the second side of the bracket and a second face opposing the first face;

Q) the second face faces away from the second side;

R) the second face is unsurrounded by the bracket; and

S) the bracket, the post, the attachment feature and the first and second stops are formed by injection molding.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
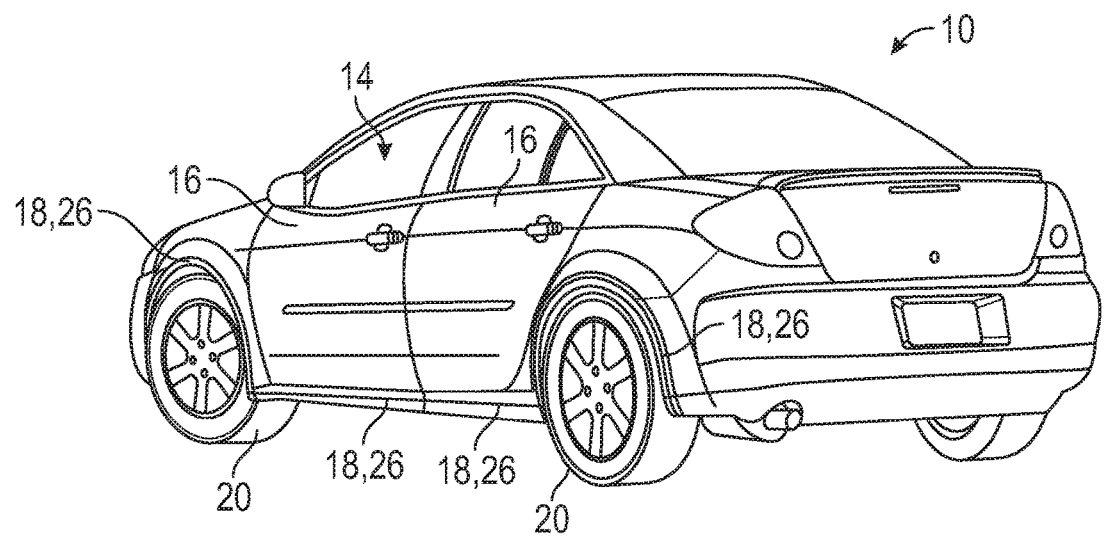
FIG. 1 is a schematic perspective view of a vehicle.
Figure 2:
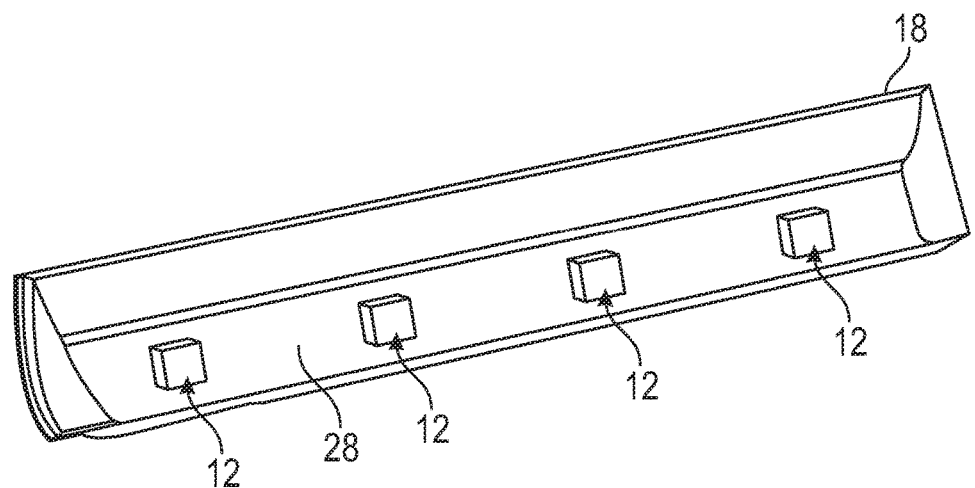
FIG. 2 is a schematic perspective view of a back side of a component of the vehicle, with a plurality of clip assemblies attached thereto.

Referring to the FIGS., wherein like numerals indicate like or corresponding parts throughout the several views, a vehicle 10 is generally shown in FIG. 1, and a clip assembly 12 is generally shown in FIG. 2.

The clip assembly 12 can be utilized in a vehicle application or a non-vehicle application. Non-limiting examples of the vehicles 10 can include cars, trucks, boats, watercrafts, off-road vehicles, aircrafts, farm equipment or any other suitable movable platform. Additionally, the vehicle 10 can include autonomously driven vehicles or vehicles driven via a human. Non-limiting examples of the non-vehicles can include machines, farm equipment or any other suitable non-vehicle.

For the vehicle application, the vehicle 10 can include a passenger compartment 14 (see FIG. 1). Generally, one or more occupants can be disposed in the passenger compartment 14. Furthermore, for a vehicle 10 driven by the human, one of the occupants can steer the vehicle 10 from the passenger compartment 14. The passenger compartment 14 can have one or more doors 16 that open and close to allow the occupants to enter and exit the vehicle 10.

Continuing with FIG. 1, the vehicle 10 can include a component 18, some of which are visible from the outside of the passenger compartment 14 of the vehicle 10. Generally, the vehicle 10 can include a plurality of components 18, and non-limiting examples of different suitable components 18 with locations are identified in FIG. 1 for illustrative purposes only. The vehicle 10 can also include one or more wheels 20. The component(s) 18 can be any suitable configuration, and non-limiting examples can include one or more of: exterior trim piece(s), molding(s), mud flap guard(s), wheel opening molding(s), rocker molding(s) or guard(s), etc.

The clip assembly 12 can be attached to the component 18. In certain embodiments, a plurality of clip assemblies 12 can be utilized, and in this embodiment, each of the clip assemblies 12 is attached to the component 18. If utilizing a plurality of components 18, one or more clip assemblies 12 can be attached to each of the components 18. FIG. 2 illustrates multiple clip assemblies 12 schematically, and the details of which are best illustrated in FIGS. 3 and 4.

Figure 3:
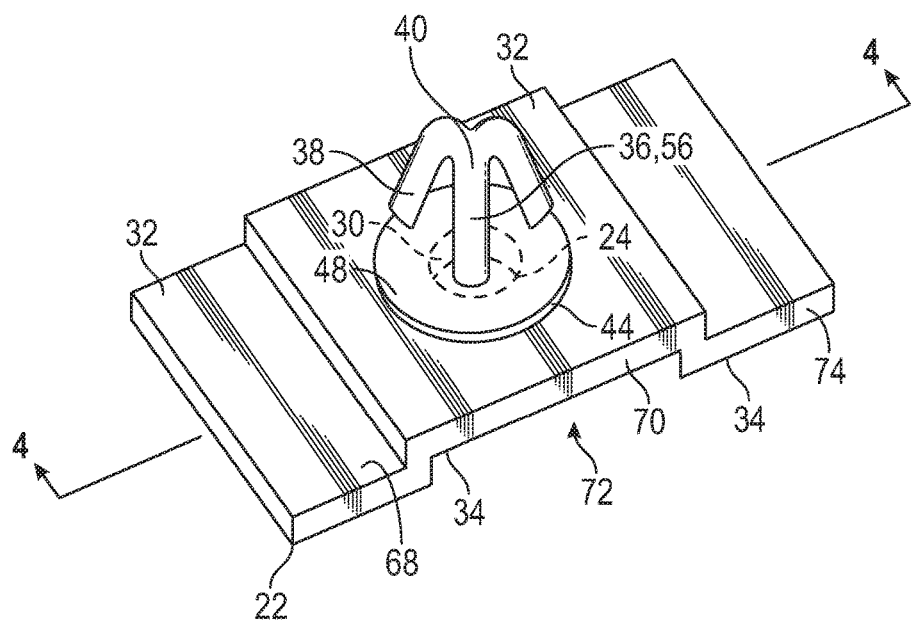
FIG. 3 is a schematic perspective view of one clip assembly.
Figure 4:
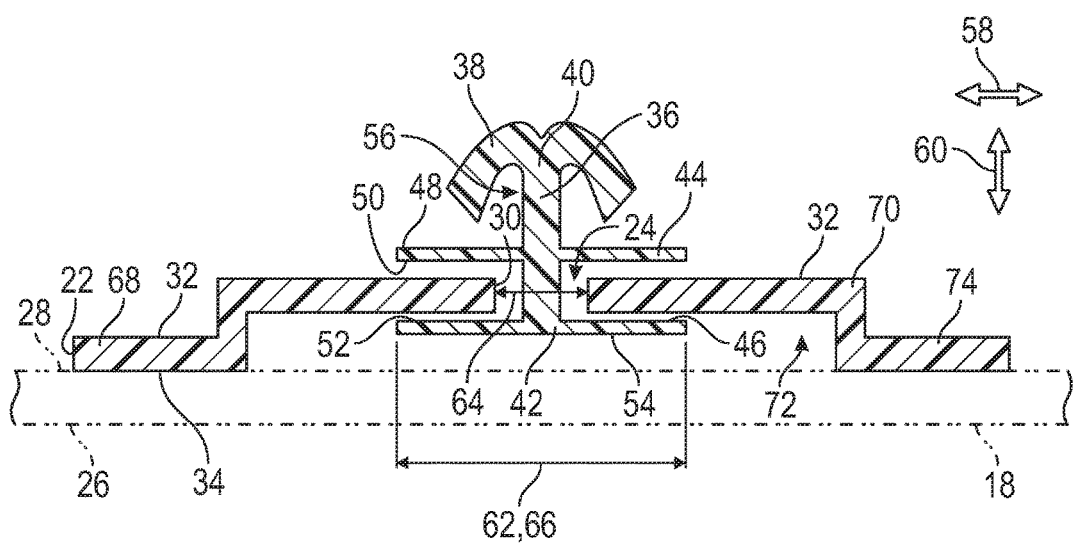
FIG. 4 is a schematic cross-sectional view of the clip assembly taken from lines 4-4 of FIG. 3, with the component shown in phantom lines.

Referring to FIGS. 3 and 4, the clip assembly 12 includes a bracket 22 defining a hole 24. For the vehicle application, the bracket 22 can be secured to the component 18. Specifically, the component 18 can include a front side 26 (see FIG. 1) and a back side 28 (see FIG. 2), with the front side 26 visible from outside of the vehicle 10. The back side 28 faces inside the vehicle 10, and is generally not visible from outside of the vehicle 10. In certain embodiments, the bracket 22 can be secured to the back side 28 of the component 18 such that the clip assembly 12 is not visible from outside of the vehicle 10.

Referring to FIGS. 3 and 4, the bracket 22 includes an inner surface 30 defining an outer boundary of the hole 24. The bracket 22 further includes a first side 32 and a second side 34 opposing the first side 32. The hole 24 is defined through the first and second sides 32, 34. Furthermore, the inner surface 30 is disposed between the first and second sides 32, 34. The hole 24 can be any suitable configuration, and non-limiting examples can include circular, oval, oblong, square, triangular, polygonal, irregular shape, etc.

Continuing with FIGS. 3 and 4, the clip assembly 12 also includes a post 36 disposed through the hole 24, and an attachment feature 38 formed to the post 36. The attachment feature 38 can secure the clip assembly 12 to another structure. For example, the attachment feature 38 can secure the clip assembly 12 to the vehicle 10. As such, if the clip assembly 12 is attached to the component 18, the attachment feature 38 is utilized to attach the component 18 to the vehicle 10.

The attachment feature 38 can bias inwardly to allow insertion through another structure and bias back outwardly when secured to the vehicle 10. The attachment feature 38 can be formed of any suitable material(s) and can be any suitable configuration. Furthermore, more than one attachment feature 38 can be formed to the post 36. In certain embodiments, the attachment feature 38 can include a barb extending outwardly from the post 36. Other non-limiting examples of the attachment feature 38 can include one or more hook(s), prong(s), spike(s), spine(s), tab(s), bulb(s), fastener(s), etc.

Generally, the post 36 can include a first distal end 40 and a second distal end 42 spaced from each other. Furthermore, in certain embodiments, the attachment feature 38 can be disposed at the first distal end 40. Therefore, in various embodiments, the barb can be disposed at the first distal end 40.

As best shown in FIG. 4, the clip assembly 12 further includes a first stop 44 formed to the post 36 and a second stop 46 formed to the post 36. The first stop 44 is disposed between the first side 32 of the bracket 22 and the attachment feature 38. Generally, the second stop 46 is spaced from the first stop 44, and the bracket 22 is disposed between the first and second stops 44, 46.

Generally, the post 36 is movable relative to the bracket 22 to provide adjustments during the assembly process. For example, when the attachment feature 38 is being secured to another structure, the post 36 is movable relative to the bracket 22 to position the attachment feature 38 relative to the structure which can account for manufacturing tolerances.

The first stop 44 can include a first face 48 and a second face 50 opposing the first face 48 of the first stop 44. Furthermore, the second stop 46 can include a first face 52 and a second face 54 opposing the first face 52 of the second stop 46. Generally, the first face 48 of the first stop 44 faces away from the first side 32 of the bracket 22, and the second face 50 of the first stop 44 faces the first side 32 of the bracket 22. Additionally, the first face 52 of the second stop 46 faces the second side 34 of the bracket 22, and the second face 54 of the second stop 46 faces away from the second side 34 of the bracket 22.

As best shown in FIG. 3, the post 36 can include an outer surface 56 spaced from the inner surface 30 when the post 36 is centered in the hole 24 to define a radial degree of freedom 58 (see arrow labeled 58 in FIG. 4) that the post 36 is movable relative to the inner surface 30. Simply stated, the post 36 can be positioned off-center relative to the center of the hole 24. As such, the inner surface 30 provides the maximum boundary of radial movement of the post 36 relative to the inner surface 30. Therefore, the post 36 can move side to side relative to the inner surface 30, and/or the post 36 can move transverse to the inner surface 30.

Additionally, the first and second stops 44, 46 are spaced apart to define an axial degree of freedom 60 (see arrow labeled 60 in FIG. 4) that the post 36 is movable through the hole 24. Simply stated, the post 36 can move up and down relative to the bracket 22. The distance that the first and second stops 44, 46 are spaced from each other along the post 36 provides the maximum boundary of axial movement of the post 36 relative to the bracket 22. Therefore, the attachment feature 38 can be disposed closer to the first side 32 of the bracket 22 or disposed farther away from the first side 32 of the bracket 22. For example, if the first face 52 of the second stop 46 abuts the second side 34 of the bracket 22 in a substantially parallel manner, the attachment feature 38 is at a maximum distance from the first side 32 of the bracket 22. As another example, if the second face 50 of the first stop 44 abuts the first side 32 of the bracket 22 in a substantially parallel manner, the attachment feature 38 is at a minimum distance from the first side 32 of the bracket 22. The maximum distance is greater than the minimum distance.

Referring to FIGS. 3 and 4, the first stop 44 can include a first disk having an outer diameter 62 greater than a diameter 64 of the hole 24. Additionally, the second stop 46 can include a second disk having an outer diameter 66 greater than the diameter 64 of the hole 24. Generally, the first and second disks can be the same configuration, and thus, the first disk as illustrated in FIG. 3 can also represent the configuration of the second disk.

In certain embodiments, the first and second disks retain the post 36 and the attachment feature 38 relative to the bracket 22. The first and second disks can also limit movement of the post 36 and the attachment feature 38 relative to the bracket 22. Generally, in various embodiments, the first disk can be spaced between the first and second distal ends 40, 42, and the second disk can be disposed at the second distal end 42. Therefore, if the second face 50 of the first disk abuts the first side 32 of the bracket 22 in a substantially parallel manner, the attachment feature 38 is at the minimum distance from the first side 32 of the bracket 22, and if the first face 52 of the second disk abuts the second side 34 of the bracket 22 in a substantially parallel manner, the attachment feature 38 is at the maximum distance from the first side 32 of the bracket 22.

As best shown in FIG. 4, the second side 34 of the bracket 22 is open such that the second stop 46 is unsurrounded by the bracket 22 relative to the second side 34. Having the bracket 22 being open along the second side 34 allows the axial degree of freedom 60 of movement of the post 36. Simply stated, the bracket 22 does not hinder or limit movement of the second stop 46 to the minimum distance of the attachment feature 38 relative to the first side 32. Furthermore, by having the bracket 22 being open, the bracket 22 is formed utilizing less material as compared to a bracket that surrounds the second stop 46, and thus, the bracket 22 can cost less and weigh less.

Referring to FIGS. 3 and 4, the bracket 22 can include a base portion 68 and a raised portion 70 that steps outwardly from the base portion 68 to define a recess 72. In the vehicle application, the base portion 68 can be secured to the back side 28 of the component 18 and the raised portion 70 can be spaced from the back side 28 of the component 18.

Generally, the raised portion 70 can define the hole 24, and the second stop 46 can be disposed in the recess 72. As shown in FIG. 4, the recess 72 is open away from the second side 34 of the bracket 22. In other words, the recess 72 is unsurrounded by the bracket 22 relative to the second side 34 of the bracket 22. Said differently, the recess 72 is not enclosed or not contained by the bracket 22. In certain embodiments, the second face 54 of the second stop 46 is unsurrounded by the bracket 22. Having the bracket 22 open along the recess 72 allows the axial degree of freedom 60 of movement of the post 36. Simply stated, the recess 72 being open does not hinder or limit movement of the second stop 46 to the minimum distance of the attachment feature 38 relative to the first side 32.

Continuing with FIGS. 3 and 4, the base portion 68 can be further defined as a first base portion 68 and the bracket 22 can further include a second base portion 74 spaced from the first base portion 68. The raised portion 70 can be disposed between the first and second base portions 68, 74 such that the recess 72 is disposed between the first and second base portions 68, 74. In the vehicle application, the first and second base portions 68, 74 can be secured to the back side 28 of the component 18 and the raised portion 70 can be spaced from the back side 28 of the component 18, and therefore, the recess 72 is disposed between the raised portion 70 and the back side 28 of the component 18.

The clip assembly 12 can be formed by various processes. For example, the clip assembly 12 can be formed by molding. In certain embodiments, the bracket 22, the post 36, the attachment feature 38 and the first and second stops 44, 46 are formed by injection molding. Generally, the bracket 22, the post 36, the attachment feature 38 and the first and second stops 44, 46 are formed by injection molding in one process, i.e., at the same time. Once the bracket 22, the post 36, the attachment feature 38 and the first and second stops 44, 46 are formed via the molding process, then another process can attach the clip assembly 12 to the component 18.

For example, the component 18 can be formed by molding. In certain embodiments, the component 18 can be formed by injection molding. The clip assembly 12 can be placed in a mold and the component 18 can be formed to the clip assembly 12 through over-molding. Therefore, the clip assembly 12 or assemblies 12 can be directly attached to the component 18, without having any intervening secondary bracket as discussed in the background section above. It is to be appreciated that the clip assembly 12 can be attached to the component 18 by other methods, and non-limiting examples can include bonding, sonic welding, heat staking, adhesive, etc. The clip assembly 12 design also can provide a reduction in tooling costs and packaging space reduction.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A clip assembly comprising:
   a bracket defining a hole, and the bracket includes an inner surface defining an outer boundary of the hole;
   wherein the bracket includes a first side and a second side opposing the first side, with the hole defined through the first and second sides, and the inner surface disposed between the first and second sides;
   a post disposed through the hole, and the post includes an outer surface and a first distal end;
   an attachment feature formed to the first distal end of the post;
   wherein the attachment feature includes a finger having an outer surface and an inner surface that faces the outer surface of the post;
   a first stop formed to the post and disposed between the first side of the bracket and the attachment feature;
   wherein the inner surface of the finger extends from the first distal end of the post and curves outwardly away from the outer surface of the post and toward the first stop, and the inner surface of the finger terminates at a distal end, with the distal end of the inner surface of the finger disposed closer to the first stop than to the first distal end of the post;
   a second stop formed to the post and spaced from the first stop, with the bracket disposed between the first and second stops; and
   wherein the second side of the bracket is open such that the second stop is unsurrounded by the bracket relative to the second side.

2. The assembly as set forth in claim 1 wherein the outer surface of the post is spaced from the inner surface of the bracket when the post is centered in the hole to define a radial degree of freedom that the post is movable relative to the inner surface of the bracket.

3. The assembly as set forth in claim 1 wherein the first and second stops are spaced apart to define an axial degree of freedom that the post is movable through the hole.

4. The assembly as set forth in claim 1 wherein:
the finger is further defined as a first finger;
the attachment feature includes a second finger opposing the first finger, and the second finger has an outer surface and an inner surface that faces the outer surface of the post; and
the inner surface of the second finger extends from the first distal end of the post and curves outwardly away from the outer surface of the post and toward the first stop, and the inner surface of the second finger terminates at a distal end, with the distal end of the inner surface of the second finger disposed closer to the first stop than to the first distal end of the post.

5. The assembly as set forth in claim 1 wherein:
the bracket includes a base portion and a raised portion that steps outwardly from the base portion to define a recess;
the raised portion defines the hole; and
the second stop is disposed in the recess.

6. The assembly as set forth in claim 5 wherein the base portion is further defined as a first base portion and the bracket further includes a second base portion spaced from the first base portion, with the raised portion disposed between the first and second base portions such that the recess is disposed between the first and second base portions.

7. The assembly as set forth in claim 1 wherein:
the first stop includes a first disk having an outer diameter greater than a diameter of the hole;
the second stop includes a second disk having an outer diameter greater than the diameter of the hole; and
the first and second disks retain the post and the attachment feature relative to the bracket.

8. The assembly as set forth in claim 7 wherein the attachment feature includes a barb extending outwardly from the post.

9. The assembly as set forth in claim 8 wherein the post includes a second distal end spaced from the first distal end, with the barb disposed at the first distal end and the disk disposed at the second distal end, and wherein the first disk is spaced between the first and second distal ends.

10. The assembly as set forth in claim 1 wherein the second stop includes a first face facing the second side of the bracket and a second face opposing the first face, with the second face facing away from the second side, and wherein the second face is unsurrounded by the bracket.

11. The assembly as set forth in claim 1 wherein the bracket, the post, the attachment feature and the first and second stops are formed relative to each other at the same time by injection molding.

12. The assembly as set forth in claim 1 wherein:
the outer surface of the post is spaced from the inner surface of the bracket when the post is centered in the hole to define a radial degree of freedom that the post is movable relative to the inner surface of the bracket;
the first and second stops are spaced apart to define an axial degree of freedom that the post is movable through the hole;
the bracket includes a base portion and a raised portion that steps outwardly from the base portion to define a recess;
the raised portion defines the hole;
the second stop is disposed in the recess;
the first stop includes a first disk having an outer diameter greater than a diameter of the hole;
the second stop includes a second disk having an outer diameter greater than the diameter of the hole;
the first and second disks retain the post and the attachment feature relative to the bracket;
the post includes a second distal end spaced from the first distal end, with the second disk disposed at the second distal end;
the first disk is spaced between the first and second distal ends; and
the bracket, the post, the attachment feature and the first and second stops are formed by injection molding.

13. A vehicle comprising:
a component;
a clip assembly attached to the component, and wherein the clip assembly includes:
a bracket defining a hole, and the bracket includes an inner surface defining an outer boundary of the hole;
wherein the bracket includes a first side and a second side opposing the first side, with the hole defined through the first and second sides, and the inner surface disposed between the first and second sides;
a post disposed through the hole;
an attachment feature formed to the post;
a first stop formed to the post and disposed between the first side of the bracket and the attachment feature;
a second stop formed to the post and spaced from the first stop, with the bracket disposed between the first and second stops;
wherein the second side of the bracket is open such that the second stop is unsurrounded by the bracket relative to the second side;
wherein the bracket includes a base portion and a raised portion that steps outwardly from the base portion to define a recess; and
wherein the second stop is disposed in the recess;
wherein the bracket and the component are secured to each other, and the component overlaps the bracket to close the recess between the bracket and the component; and
wherein the component is spaced from the second stop to allow an axial degree of freedom that the post is movable through the hole.

14. The vehicle as set forth in claim 13 wherein the post includes an outer surface spaced from the inner surface when the post is centered in the hole to define a radial degree of freedom that the post is movable relative to the inner surface.

15. The vehicle as set forth in claim 13 wherein the first and second stops are spaced apart to define a maximum of the axial degree of freedom that the post is movable through the hole.

16. The vehicle as set forth in claim 13 wherein the second stop includes a first face facing the second side of the bracket and a second face opposing the first face, with the second face facing away from the second side, and wherein the second face is unsurrounded by the bracket.

17. The vehicle as set forth in claim 13 wherein:
the raised portion defines the hole;
the post includes an outer surface and a first distal end;
the attachment feature includes a finger having an outer surface and an inner surface that faces the outer surface of the post; and
the inner surface of the finger extends from the first distal end of the post and curves outwardly away from the outer surface of the post and toward the first stop, and the inner surface of the finger terminates at a distal end, with the distal end of the inner surface of the finger disposed closer to the first stop than to the first distal end of the post.

18. The vehicle as set forth in claim 17 wherein the base portion is further defined as a first base portion and the bracket further includes a second base portion spaced from the first base portion, with the raised portion disposed between the first and second base portions such that the recess is disposed between the first and second base portions.

19. The vehicle as set forth in claim 13 wherein:
the post includes an outer surface spaced from the inner surface when the post is centered in the hole to define a radial degree of freedom that the post is movable relative to the inner surface;
the first and second stops are spaced apart to define a maximum of the axial degree of freedom that the post is movable through the hole;
the raised portion defines the hole;
the first stop includes a first disk having an outer diameter greater than a diameter of the hole;
the second stop includes a second disk having an outer diameter greater than the diameter of the hole;
the first and second disks retain the post and the attachment feature relative to the bracket;
the post includes a first distal end and a second distal end spaced from each other, with the attachment feature disposed at the first distal end and the second disk disposed at the second distal end;
the first disk is spaced between the first and second distal ends; and
the bracket, the post, the attachment feature and the first and second stops are formed by injection molding.

20. The vehicle as set forth in claim 13 wherein the bracket, the post, the attachment feature and the first and second stops are formed relative to each other at the same time by injection molding.

* * * * *